(No Model.)
C. H. WOODBURY.
CLUTCH FOR CARD FEEDING MACHINES.
No. 555,840. Patented Mar. 3, 1896.
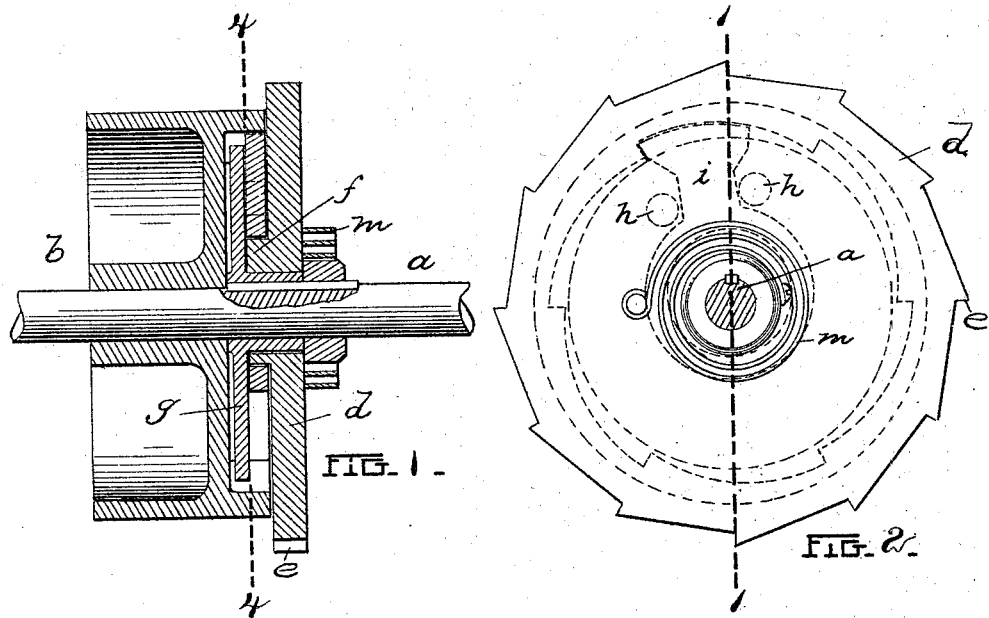
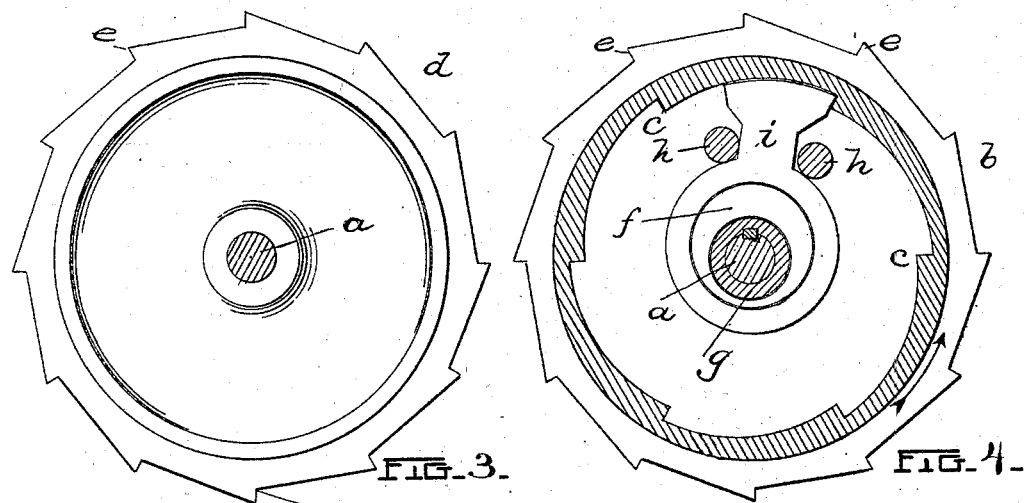

UNITED STATES PATENT OFFICE.

CHARLES H. WOODBURY, OF FRANKLIN, MASSACHUSETTS.

CLUTCH FOR CARD-FEEDING MACHINES.

SPECIFICATION forming part of Letters Patent No. 555,840, dated March 3, 1896.

Application filed January 2, 1895. Serial No. 533,537. (No model.)

*To all whom it may concern:*

Be it known that I, CHARLES H. WOODBURY, of Franklin, in the county of Norfolk and State of Massachusetts, have invented certain new and useful Improvements in Clutches for Card-Feeding Machines, of which the following is a specification.

This invention has relation to clutches generally, and particularly to such as are employed in Bramwell card-feeders to "knock off" the operating means of the lifting-apron and its adjuncts after the scale-pans shall have received their complement of wool and to connect such operating means after the scale-pans shall have discharged their load.

It is the object of the invention to provide such improvements in clutches of the character mentioned as will cause them to act instantly and with certainty, and also so that they may be operated with ease and without undue strain upon or shock to the parts.

To these ends the invention consists of a clutch comprising in its construction three members: first, a pulley or driving-wheel arranged to run loose upon the shaft and having internal rachet-teeth provided in the outer wall of a circular chamber formed in one of its sides; second, a disk fast upon the shaft, arranged in said chamber and engaging a pivoted dog which is adapted to be moved into and out of engagement with the said internal ratchet-teeth, and, third, a ratchet-disk arranged to run loose upon the shaft and provided with means to act upon the dog to positively throw it into and out of engagement with the internal teeth of the first-mentioned member, all as I will now proceed to describe and claim.

Reference is to be had to the annexed drawings and to the letters marked thereon, forming a part of this specification, the same letters designating the same parts or features, as the case may be, wherever they occur.

Of the drawings, Figure 1 is a sectional front elevation of my invention, the section being taken on the line 1 1 of Fig. 2. Fig. 2 is a side view of the invention, showing by full and dotted lines the relationship of all of the parts. Fig. 3 is a side view of the ratchet-wheel with which the trip-latch engages to effect the knocking off, the latter device being also shown. Fig. 4 is a sectional view taken on the line 4 4 of Fig. 1.

In the drawings, $a$ designates the driven shaft, the operations of which are controlled by the invention.

$b$ is a pulley (though it might as well be a toothed gear or sprocket wheel) loosely arranged on the shaft $a$, and which may be operated by a belt or other suitable means. (Not shown.) The pulley is provided in its outer side with a circular chamber, in the outer walls of which chamber there are internal ratchet-teeth $c$.

$d$ designates a ratchet wheel or disk, also loosely arranged on the shaft $a$ and provided on its periphery with ratchet-teeth $e$, and on its inner face and surrounding the shaft $a$ with an eccentric $f$.

$g$ is a disk secured to the shaft $a$ so as to turn therewith, and arranged between the ratchet-wheel $d$ and the pulley $b$ and in the circular chamber formed in the side of the latter. The said disk $g$ is provided in its side with rounded studs or lugs $h\ h$, between which extends the shank of a dog $i$, the inner end of which is adapted to be thrown into and out of engagement with the internal ratchet-teeth $c$ by the operation of the eccentric $f$.

$j$ designates a trip-latch pivoted at $k$ and adapted to be operated by a rod $l$ connected therewith.

$m$ is a spring connected at one end to the shaft $a$ and at the other end to the ratchet-wheel $g$, and operating with a tendency to turn the said ratchet-wheel in the direction of the arrow marked thereon in Fig. 4, carrying the eccentric $f$ in the same direction.

In the operation of the invention supposing the pulley or wheel $b$ to be driven in any suitable way and the trip-latch to be out of engagement with the teeth of the ratchet-wheel $g$. Under these circumstances the spring will have been operated to turn the eccentric $f$ on the said ratchet-wheel so as to throw the dog $i$ out into engagement with the internal teeth of the pulley $b$ and the parts will be in clutch so that the shaft $a$ will be driven.

The moment it is desired to stop the rotation of the shaft, as, say, for example, when the scale-pans of a card-feeding machine shall have received their complement of material, the trip-latch $j$ will be operated so as to engage the teeth of the ratchet-wheel $g$ and hold it back against rotation, so that the eccentric in effect will be actuated in a direction contrary to that indicated by the arrow in Fig. 4 and the dog $i$ will be drawn back and down out of engagement with the internal teeth of the pulley or wheel $b$, and the parts will be in unclutched position, allowing the pulley or wheel to run free on the shaft without actuating the same.

When it is desired to start the shaft again, the trip-latch will be moved out of engagement with the teeth of the ratchet-wheel, and the spring $m$ will actuate the eccentric or cam $f$, so as to again put the parts in clutch position.

The fact that the dog is drawn back as well as downward from engagement with the internal teeth of the pulley or wheel $b$ is an important feature of the invention, since this operation can be easily accomplished and avoids undue wear of the parts.

I do not limit myself to the precise form of means between the disk $g$ and dog $i$ for actuating the latter from the former, as it is obvious that other forms of cam connection than the eccentric $f$ may be employed.

I may use as many internal ratchet-teeth on the pulley or wheel $b$ and ratchet-wheel $g$ as may be necessary.

By my invention it will be seen that the clutch is made certain in its operation, and it may be made to act to all intents and purposes instantly.

Having thus explained the nature of the invention and described a way of constructing and using the same, though without attempting to set forth all of the forms in which it may be made or all of the modes of its use, it is declared that what is claimed is—

1. A clutch of the character described comprising in its construction, a shaft, a driving member loose on said shaft and having internal teeth on one of its sides, a dog adapted to be moved into and out of engagement with said internal teeth, a disk fast on said shaft and engaging said dog, and a ratchet-disk arranged to run loose upon the shaft and provided with means, as an eccentric, to act upon the dog to withdraw it from, and move it into engagement with the said internal teeth, combined with a trip-latch for engaging said ratchet-disk.

2. A clutch of the character described comprising in its construction, a shaft, a driving member arranged to run loose upon the shaft and having internal ratchet-teeth formed in the outer wall of a circular chamber formed in one of its sides, a dog adapted to be moved into and out of engagement with the said teeth, a disk fast upon the shaft, arranged in the said circular chamber and engaging said dog, and a ratchet-disk arranged to run loose upon the shaft, and provided with means, as an eccentric, to act upon the dog to positively withdraw it from, and move it into, engagement with said internal teeth, combined with a trip-latch for engaging said ratchet-disk.

In testimony whereof I have signed my name to this specification, in the presence of two subscribing witnesses, this 10th day of November, A. D. 1894.

CHARLES H. WOODBURY.

Witnesses:
ARTHUR W. CROSSLEY,
C. C. STECHER.